United States Patent [19]

Goldsberry

[11] Patent Number: 4,862,858
[45] Date of Patent: Sep. 5, 1989

[54] FUEL EXPANSION SYSTEM WITH PREHEATER AND EMI-HEATED FUEL INJECTOR

[76] Inventor: James Goldsberry, VP-MAU, NAS Moffet, Calif. 94035

[21] Appl. No.: 317,289

[22] Filed: Feb. 28, 1989

[51] Int. Cl.$^4$ .................. F02M 33/00; F02M 31/16
[52] U.S. Cl. .................................. 123/538; 123/557
[58] Field of Search ............... 123/536, 537, 538, 557, 123/547

[56] References Cited

U.S. PATENT DOCUMENTS

| | | | |
|---|---|---|---|
| 3,116,726 | 1/1964 | Kwartz | 123/538 |
| 4,414,951 | 11/1983 | Saneto | 123/536 |
| 4,422,429 | 12/1983 | Reed | 123/557 |
| 4,742,810 | 5/1988 | Anders et al. | 123/538 |

Primary Examiner—Willis R. Wolfe
Assistant Examiner—M. Macy
Attorney, Agent, or Firm—Schmeiser, Morelle & Watts

[57] ABSTRACT

A self cleaning, fuel expansion system for an internal combustion engine. Methods are applied through apparatus for pretreatment of liquid fuel prior to the fuel usage by an internal combustion engine, whether such usage conceives of carburetion or direct fuel injection. A staged, gradual heating and expansion of the fuel is afforded by: first, a conduction-type heater that is essentially a conduit taking its heat directly from the exhaust manifold of an engine; second, a sonic heating conduit that contains a tuning assembly therein that is responsive to the pulsating fuel pump output and which responds by imparting a modulated vibratory pattern to the fuel passing therethrough, while heating the fuel by both the vibrations imparted and conduction of heat from another system part; and third, passing nebulized fuel from an injector into a foraminous dispersing head that is concurrently heated by a process of electromagnetic induction (EMI), thereby completely vaporizing the fuel immediately prior to its induction by the engine. The sonic tube heater-cleaner, as well as the EMI-heated dispersing head work in conjunction to provide a continuously high pressure fuel flow of vapor phase fuel to any form of combustion engine.

10 Claims, 6 Drawing Sheets

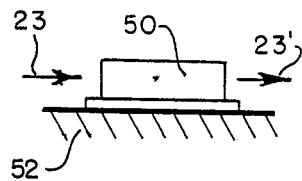
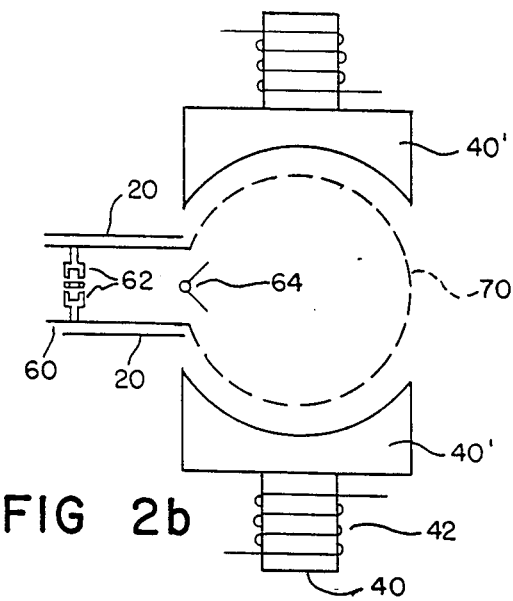
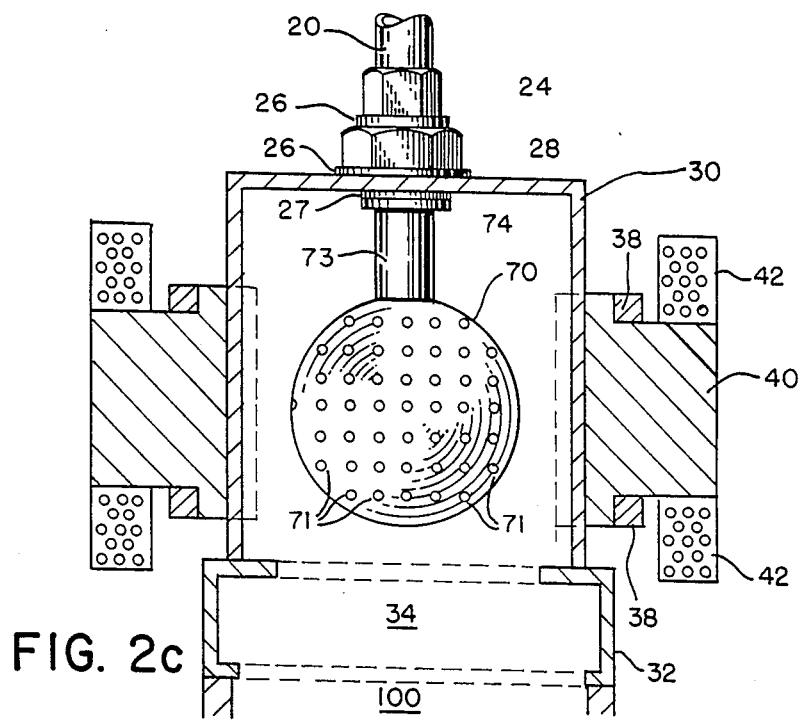

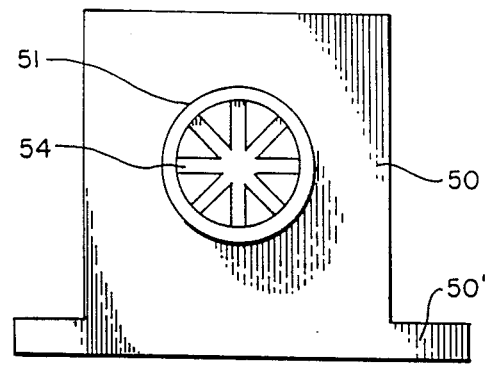
FIG. 3a
FIG. 3b
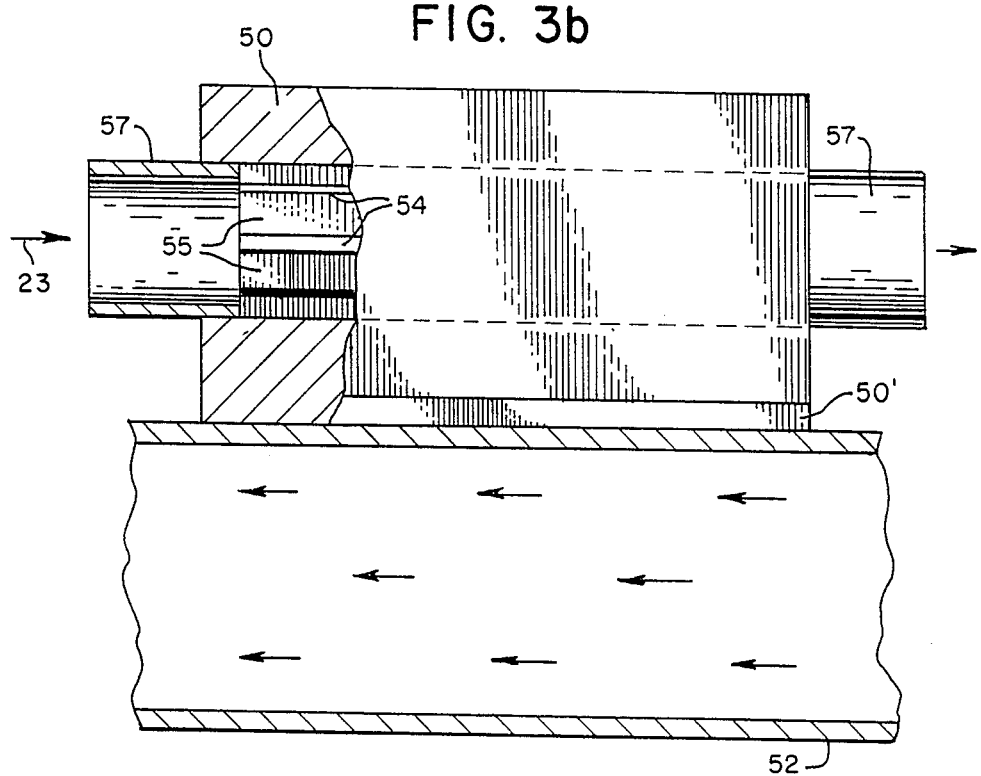

FUEL EXPANSION SYSTEM WITH PREHEATER AND EMI-HEATED FUEL INJECTOR

BACKGROUND OF THE INVENTION

1. Field of the Invention

The present invention relates to a fuel expansion system for use in an internal combustion engine. Specifically, there is disclosed herein the methodology for pretreating liquid fuel wherein such pretreatment is provided by a staged, gradual heating and expansion of the fuel and its attainment of a peak heated and expanded condition by use of a novel electromagnetic induction (EMI) heating - dispersing head. After treatment of the fuel, it is injected into the engine, either at the throat of the conventional carburetor or directly into the heads of the cylinders, as is currently done with fuel injected engines.

2. Discussion of the Prior Art

The Fulenwider, Jr., U.S. Pat. No. 4,064,852, for a MICROWAVE ENERGY APPARATUS AND METHOD FOR INTERNAL COMBUSTION ENGINE, teaches a device for Vaporizing and heating liquid fuel for use in an internal combustion engine by subjecting the liquid to a radio frequency microwave energy before introduction into the engine cylinders. The approach is distinctly different from the instant invention in that Fulenwider, Jr. employs radio frequency (RF) energy treatment of the gasoline-Water-air mixture subsequent to carburetion and as the mixture is being injected into the intake manifold. Because there is a high intensity treatment of the fuel-air mixture prior to introduction to the engine proper, the instant inventor feeling that such a system lacked a good deal of inherent safety, decided to pretreat only fuel and avoid the art of Fulenwider, Jr., in all of its aspects.

Inventors Abe et al. in U.S. Pat. No. 4,450,823 employ a fuel evaporator, a PTC resistance element-heated ceramic plate, for heating the fuel and evaporating it prior to introduction into the air-fuel intake passage of an engine. The plate is an electrically heated ceramic element having a foraminous (perforated) surface through which fuel is inducted into the carburetor of the engine. Anders et al. in U.S. Pat. No. 4,742,810, disclose an ultrasonic atomizer system to atomize fuel which is to be injected into internal combustion engines. The atomizer system includes an atomizer housing having a pressure chamber into which fuel is delivered under pressure by a pump. An ultrasonic vibrator protrudes into the atomizer housing; therefore, Anders et al. provide a true fuel injector, using the ultrasonic device within the injector itself. The invention of Tuckey, U.S. Pat. No. 4,458,654, provides standard carburetion and delivers liquid fuel into a heating chamber which is colocated in the throttle body of a carburetor. Tuckey employs resistance elements, not unlike the art of Abe, but meters exhaust gases into the throttle body. Earle, U.S. Pat. No. 4,574,764 teaches a fuel vaporization method and apparatus. This disclosure details a means for using engine heat to conductively heat carburetor air-fuel mixtures after carburetion. Rawlings, U.S. Pat. No. 4,708,118, does something more than the aforesaid inventors by heating air as it is taken into the air intake manifold. A resistance heating element is situated within the air intake apparatus and a thermistor is disposed downstream of the heating element to insure that the air drawn through the air intake apparatus, into the intake manifold, is heated to a temperature within the range of 160 degrees F. to 180 degrees F. Thus Rawlings, after preheating a fuel mixture, combines it with air that is also preheated.

U.S. Pat. No. 4,715,353, issued to Koike et al. in 1987, discloses the use of ultrasonic waves for the purpose of atomizing the fuel of an internal combustion engine which is being carbureted in the normal fashion. The inventor is concerned primarily with the electronics of the atomizing system, as well as the feedback control of the circuit.

To the instant inventor, after this study of the prior art, it appeared that no previous inventor has sought to employ his staged technique of pretreating only fuel for use in an internal combustion engine. Most notably, there is no extant reference to the use of EMI heating of an expansion and dispersion element. Sonic cleaning devices are, of course, well known in the art; but the novel method of attaining ultrasonic stimulation as in the instant invention, has not come to the instant inventor through any of the extensive readings made or searches conducted in the prior art. The use of RF energy for the purposes of heating a fuel or fuel-air mixture was eschewed by the instant inventor more for reasons of practicality rather then any other reason that can only be inferred.

Many objectives and advantages of the instant invention will become readily apparent to those skilled in the art from the following disclosure and from the method taken in conjunction with the accompanying drawings, in which the salient aspects of the invention are clearly delineated. It will also be apparent to those so skilled that many modifications of the basic art forms may also be made and that practice with the invention will also give rise to several derived concepts, as well as apparatus. It is the inventor's true purpose therefore to teach a method of liquid fuel pretreatment that is conducted in a set of discrete stages so that the desired effect is achieved simply and inexpensively through the use of a durable, low cost apparatus.

SUMMARY OF THE INVENTION

The overall objective of the inventor is realized in the instant methodology of treating liquid fuel before it is inducted into the carburetor of the standard engine or the injection mechanism of a fuel-injected engine. The heat stages utilized are conductive heat, ultrasonic heating and EMI heating to properly prepare the fuel for carburetion or final stage injection. In the first stage, fuel is treated by a preheater that acquires its heat through a conductive transfer mechanism from the exhaust manifold. Second stage fuel expansion and higher vibratory fuel flow is acquired through heating which occurs concurrently during a sonic treatment phase; and the third stage of expansion consists in the compound injection and expansion through an EMI-heated dispersing head. Thereafter, having acquired the desired pressure and fully vaporized expansion, the fuel is carbureted in the conventional fashion by causing it, in the disclosed embodiment, to enter the intake throat of a conventional carburetor.

More specifically, pressurized filtered fuel is passed through the control valving mechanism which regulates the volume of fuel supplied to a fuel line heat exchanger tube. The fuel line heat exchanger tube acquires its heat by conduction from the exhaust manifold, and transfers that heat to the fuel by further conduction through the heat transfer fins located in the fuel flow line. After manifold preheating, the hot fuel is passed through the sonic tube which acquires its heat primarily by conduction from a downstream injector tube. The sonic tube transfers its heat by conducting it to the fuel through vibrating tines that are integral with the sonic tube. The tines also significantly modulate he high and low pressure fuel flow zones created by the fuel pump (impeller) and thereby induce a sonic form of wave action along the walls and nozzle of the sonic tube, thereby "scrubbing" these elements. The sonic cleaning action is, in a manner similar to the heat conduction from the injector tube, passed on down to the injector tube adding its kinetic energy to the reservoir of heat energy in the Whole injection device. The heated fuel is subsequently passed to the injector, Which acquires its heat by way of conduction heating from the dispersing head, and into the dispersing head which, similar to the upstream elements, transfers its heat to the fuel by the known physical conduction mechanisms. The hot, gaseous fuel, having thus been vaporized after its contact with the dispersing head is then removed for carburetion or other induction to the engine. The EMI means of heating the dispersing head is afforded by an oscillator-induced alternating magnetic field; the field provided by at least one pair of electromagnets disposed aside the dispersing head containment chamber and which are driven by a free running, saturable core oscillator. The EMI-field producing apparatus, novel in its design, nonetheless employs standard electric circuit building concepts that are not dealt with extensively in this disclosure.

The method and apparatus of the invention Will be better understood, With further objects and advantages thereof becoming apparent, as the reader reviews the detailed description of the preferred embodiment, while examining the drawings herein.

BRIEF DESCRIPTION OF THE DRAWINGS

Of the drawings:

FIG. 2a is a schematic drawing of the manifold preheater;

FIG. 2b is a schematic drawing of the sonic tube and assembly of FIG. 1;

FIG. 2c is a partial sectional view of the FIG. 1 apparatus;

FIG. 3a is an end view of the manifold preheater;

FIG. 3b is a side elevation of the manifold preheater in partial cross section;

FIG. 6b is an electrical schematic of the oscillator circuit of the FIG. 6a.

DETAILED DESCRIPTION OF THE PREFERRED EMBODIMENT

It has already been revealed, most notably in the Summary of the Invention, that the instant invention comprises a three stage heating system wherein fuel for an internal combustion engine is gradually heated and expanded to reach a true vapor phase immediately prior to its induction into a carburetor or fuel injection system. The first stage, preheating through the use of existing exhaust manifold heat, shall be discussed hereinafter but it is to the most salient portions of the tri-stage system that the reader's attention is first called.

Figure 1:
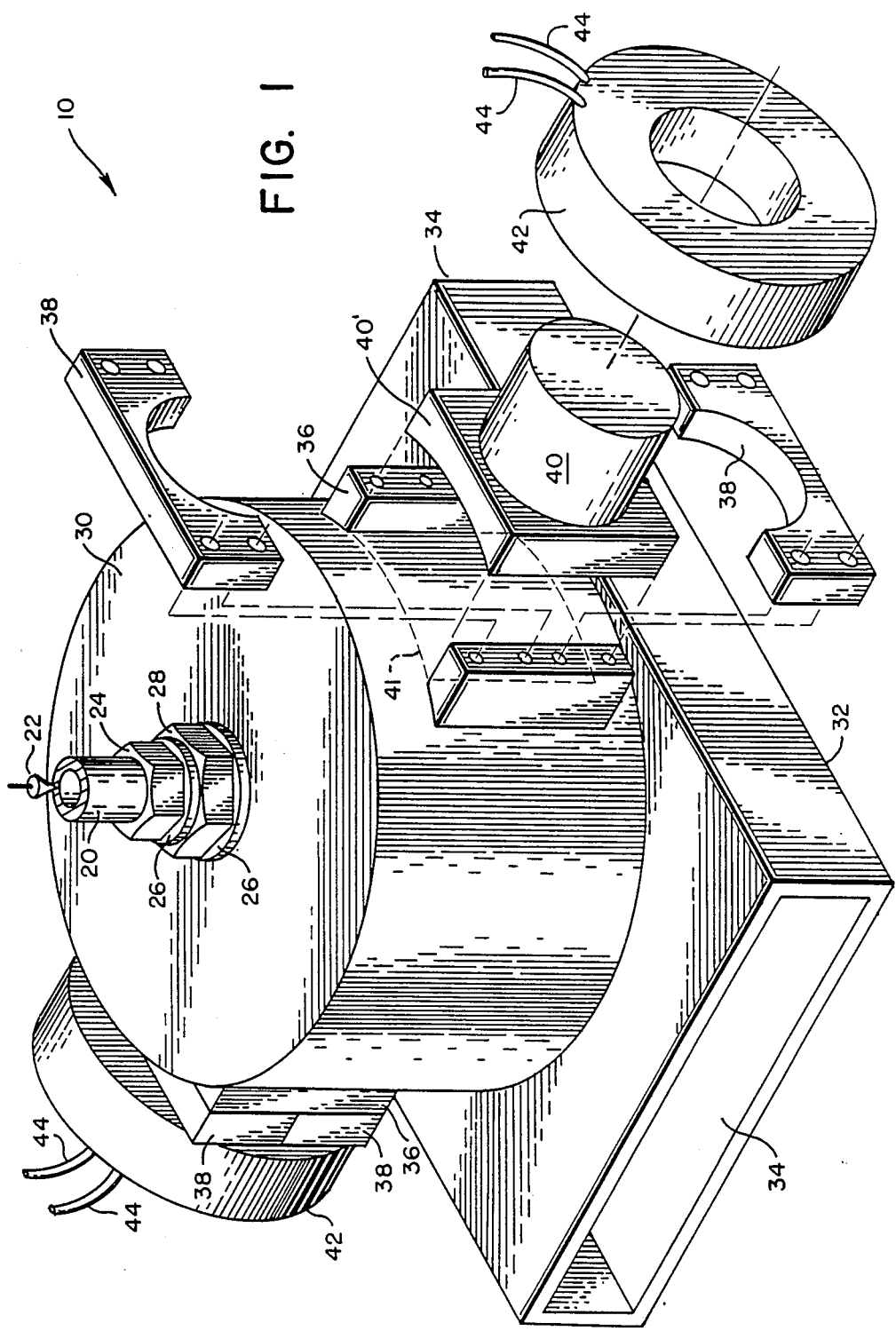
FIG. 1 is an isometric illustration of the EMI apparatus with a partially exploded view of a magnet pole piece assembly.

Referring more particularly to FIG. 1, there are illustrated, in isometric form, the sonic and EMI field generating subassemblies 10. The sonic tube (not shown) is designed and fabricated to fit inside injector housing 20. Fuel flow into the subassemblies 10 is denoted by the stylized arrow 22. Securing injector housing 20 into the top of dispersing head EMI case 30 is cap nut 24 which encompasses an exterior flange (not shown) of the injector tube. In the securement of injector tube 20 to the top of case 30 well known methods are employed as shall hereinafter be seen, including the use of lock washers 26 and lock nut 28. Similarly detailed parts, interior to the aforesaid case assembly, shall hereinafter be disclosed.

Turning to the more prominent elements detailed in FIG. 1, there are, in addition to case 30, which is comprised of a nonmagnetic material, pole pieces 40 and air intake duct 32, which has two ports 34 arranged generally orthogonal to pole piece 40 mounts 36. The air intake ports 34 are generally in communication with the interior chamber(s) of EMI subassembly case 30. Mounts 36 are arranged transverse to the general fluid flow direction denoted earlier and are, as shown herein, mounted 180 degrees from each other on the outer periphery of the case 30. Pole piece 40, generally cylindrical in shape, has a case conforming end 40' which is ultimately positioned snuggly, as depicted in FIG. 1 by the invisible lines 41, against the cylindrical surface of the case. Pole piece 40, 40' is secured against the outer surface of the case by pole piece brackets 38 which are either, as shown herein, bolted directly to mounts 36 or, should the assembly be manufactured with fixed bracket and mount, to each other. Such means of affixing pole pieces to known geometries are well detailed in the current art and remain, for all intent and purposes, the choice of the individual inventor. Unlike the case 30, the pole Pieces 40 are composed of a ferrite or any other suitable magnetic material. The pole piece-conforming coils 42 are generally shaped in the familiar toroid from Which leads 44 are taken to the supporting driving circuitry. Coil toroids 44 are slipped over the ends of the pole pieces 40 and secured thereto by known methods. Thus, save for the emplacement of the sonic tube into the injector housing 20, the sonic tube injector - EMI dispersing unit is completed in the preferred teaching of this disclosure.

Having viewed the most salient aspect of this tri-stage fuel treatment system, the reader's attention is now drawn to FIGS. 2*a* through 2*c*, wherein the three elements relating to the three stages of fuel treatment will be discussed FIG. 2*a* is a schematic drawing showing preheater 50 attached to or mounted on exhaust manifold 52. Greater detail will be given to this device in the discussion of FIGS. 3*a* and 3*b*. Suffice it to say that fuel enters the preheater 50 in the direction indicated by arrow 23 and exits as 23' . It moves downstream in its heated and somewhat expanded condition into sonic tube 60. There it encounters tuning forks 62 of sonic tube 60 and is further conditioned by heat that is being conducted to the tube 60 through injector housing 20. After the fuel is conditioned by mechanisms that will become apparent hereinafter, it is expelled through injector nozzle 64 into the dispersing head 70. Meanwhile dispersing head 70, comprised of a magnetic material such as stainless steel, and residing inside of nonmagnetic case 30 (not shown) has been subjected to a rapidly fluctuating magnetic field provided by transversly disposed magnetic subassemblies 40, 42. The rapid reversal of the magnetic field, as is generally employed in this technique of excitation by electromagnetic induction (EMI), causes the dispersing head 70 to heat intensely due to hysteresis losses. The heat from the dispersing head is conducted through dispersing head mount 72 (not shown in FIGS. 2a–2c), via its own case and holder 73 to the injector housing 20. Thus, as previously stated, injector tube 20 draws its heat from the magnetically induced heating effects in the dispersing head 70. More specifically, and with reference to FIG. 2c, the injector housing 20 is connected by the aforementioned apparatus (24, 26, 28) directly to the dispersing head 70. Sonic tube 60, a separate and distinct unit is inserted into injector housing 20 and is, in turn, heated by the injector housing. The remaining components disclosed in FIG. 2c comprise the sealing gasket 27 which is interposed between the mount flange 74 and case 30, the mount holder 73 for the dispersing head 70 and, the plurality of foramens 71 that act as exits for the heated fuel so that it might be drawn, with the air entering through ducts 34, into the interior of the engine proper 100. It can now be seen through the series of drawings in FIGS. 2a through 2c that the fuel 23 flows into the exhaust manifold heater 50, is heated and preconditioned for introduction into the dispersing head 70 -heated injector tube 20 by first encountering sonic apparatus 60, 62. The pulsing pattern of the fuel pump-driven fuel causes a sonic pattern to be established in the sonic tube by interaction with tuning forks 62. This ultrasonic vibration, in combination with the heated sonic tube, causes a further conditioning of the fuel and an evening of the fuel pump pulsation characteristic so that the fuel is further expanded and given a greater flow continuity. The sonic oscillations within the fuel stream act upon the walls of the sonic tube, injector tube and injector nozzle 64 With a cleansing effect. Thereafter, the pretreated fuel is injected into the dispersing head 70 Which is continuously subjected to a rapidly fluctuating magnetic field operating in a frequency band ranging from audio frequency (AF) to extremely high frequency (EHF). After final heating in the dispersing head mechanism 70, the fuel is expelled in a fully vaporized state through the foraminous dispersing head 70 by way of the holes or foramens 71 therein and into the intake system 100 of the engine.

FIGS. 3a –3b and FIGS. 4a –4c are used to explain the more detailed elements of the manifold preheater and sonic tube, respectively. Referring more particularly to the former, the manifold preheater, there is shown in FIG. 3a an end view of a preferred embodiment for this device. The reader will note that it is merely a block of heat-conducting material 50 having a chamber 51 therethrough in which is inserted, or built integrally therein, a heat-conductive divider network 54. The inventor terms the divider network 54 heat exchange fins, but those of ordinary skill will readily discern that any suitable heat transfer mechanism may be employed. The preferred metal for constructing the flanged 50' base or housing 50 is stainless steel. Fuel line couplings are made at 57 and are better understood by reference to FIG. 3b. Therein, the reader will note that flange 50' is mounted on exhaust manifold 52, the arrows within the exhaust manifold denoting the usual flow of exhaust gases. Heat exchange fins 54 are displayed in the sectionalized portion of FIG. 3b and it may be seen that fuel line coupling 57 abuts the heat exchange chamber 55. Current state of the art provides many modes for embodying the fuel line connection, heat exchange unit mounting and exhaust manifold connection mechanisms. For example, the instant inventor suggests that separate fuel line couplings 57 be welded at their connection with housing 50; housing 50 flanges 50' be either bolted or welded to the exhaust manifold section 52 or, in the alternative the entire unit comprising couplings 57, housing 50 and exhaust manifold section 52 be manufactured as an integral unit for connection by traditional means to an engine exhaust manifold.

Figure 4A:
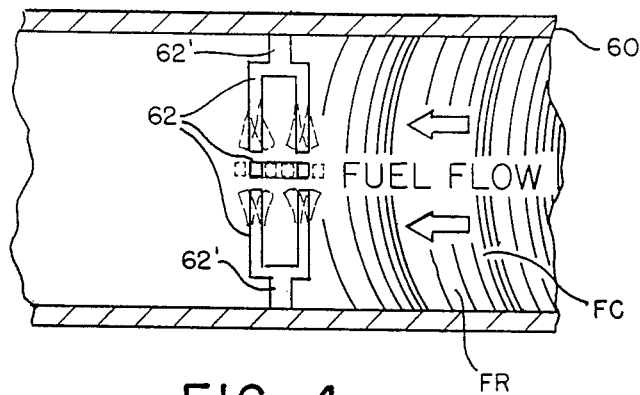
FIG. 4a is a sectionalized side view of the sonic tube.
Figure 4B:
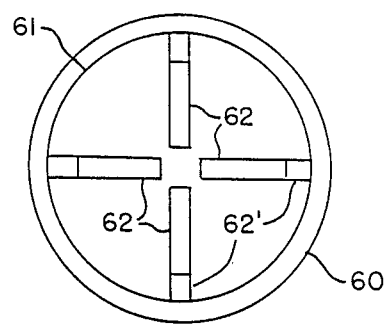
FIG. 4b is an end view looking into the sonic tube.
Figure 4C:
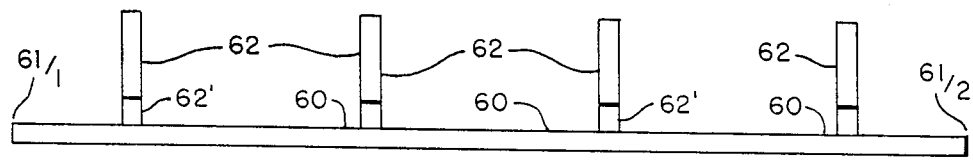
FIG. 4c is an opened sonic tube.

The second stage of fuel treatment is conducted in sonic tube 60. Referring particularly to FIG. 4a, there is depicted in sectionalized schematic view a segment of the sonic tube 60. Four tuning forks 62 are secured by each of their singular bases 62' to the interior Wall of sonic tube 60, With the tines of the forks radiating inwardly. Fuel flow is denoted by the heavy barbed arrows entering from the right hand side and indicated "Fuel Flow". Schematic depiction is made of the fuel flow at points when the liquid is exhibiting the effect of fuel pump compression, denoted FC and the lack of compression or rarefaction phase, denoted FR, between the compression peaks. The staccatic fuel flow impinges on tuning forks 62 sending them into a vibrating state. The nature of the tuning forks, based upon their particular design and composition, establishes a vibrating pattern (at the forks' 62 tuning frequency) in the fuel flow which modulates the wave at FC and at FR; thus, a consistent sonic wave pattern is established within the tube 60 lending greater continuity to the fuel flow and affording a cleansing action in the injector tube 20 and injector nozzle 64. FIG. 4b depicts the end view of sonic tube 60 and the reader's attention is called to the seam 61 which may be realized by butt welding or a similar process. FIG. 4c is an illustration of the FIG. 4'b device simply "unrolled". The inventor suggests this method of construction of the sonic tube as it will allow accurate emplacement of the tuning fork 62 mechanisms to the shell of the tube and thereafter lend itself to a rolling so that longitudinal margins 61/1 and 61/2 may be brought together as in FIG. 4b. Other methods are also available for mounting the inwardly radiating tuning forks 62, explanation of the techniques of which would digress needlessly from the scope of this disclosure.

Figure 5:
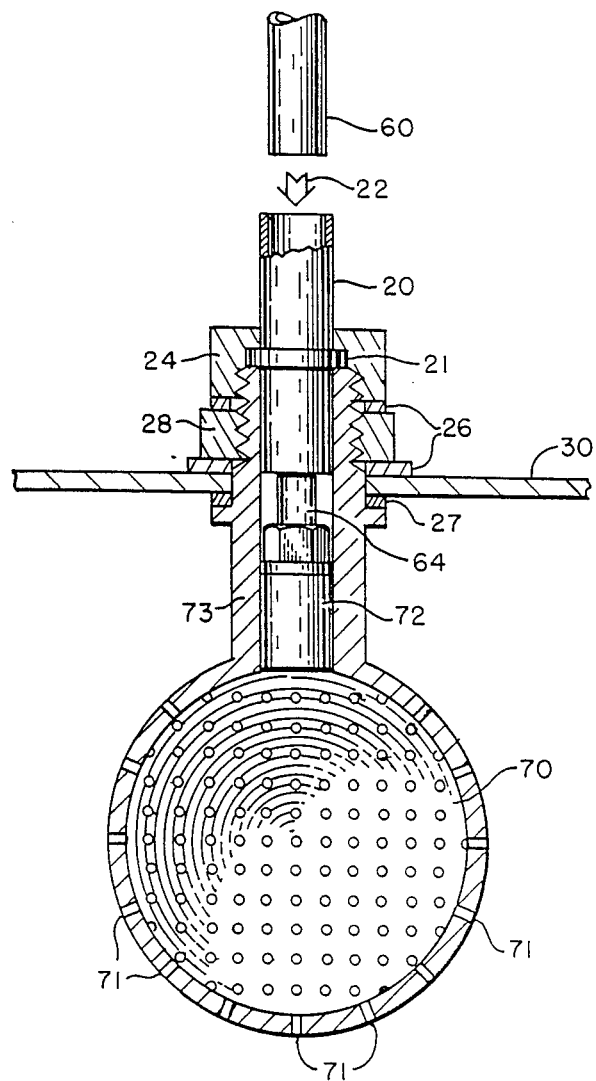
FIG. 5 is a partially sectionalized side view of the injection tube and dispersing head of the instant invention.

The assembled injector 20 - dispensing head 70 device is shown in a partially cross sectional illustration in FIG. 5. The direction of fuel flow is depicted by arrow 22 and it can be seen that sonic tube 60 is emplaced in injector housing 20 in the direction of fuel flow. All previously described apparatus relating to the mounting of dispensing head 70 to case 30 is clearly depicted herein. Injector head 64 discharges directly, through head mount 72, into the interior of the foraminous dispensing head 70. Since the dispensing head 70 is concurrently subjected to a high intensity EMI field, it, its holder 73 and all attached apparatus, such as the injector housing 20 with installed sonic tube 60, are heated intensely and conduct the heat throughout the various assemblies. It is the dispensing head, however, that attains the greatest heat intensity and it is at this point that the preheated fuel, already in a nebulized state, is vaporized and expelled through foramens 71 into case 30 for induction into the main intake apparatus 100 of the engine.

Figure 6A:
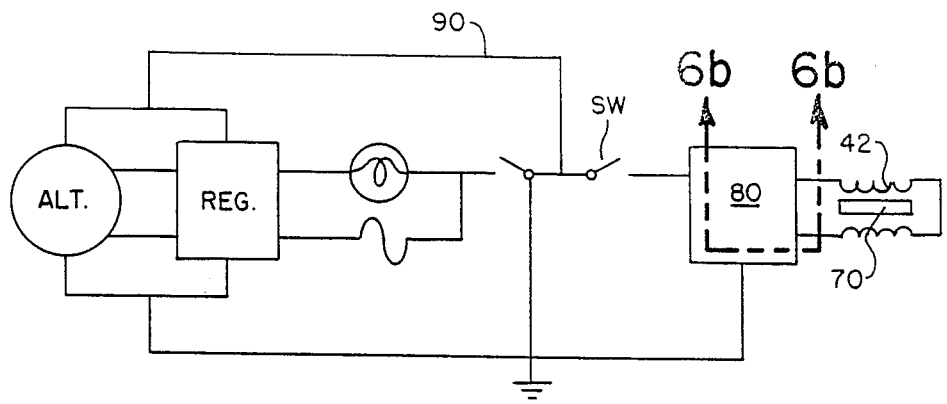
FIG. 6a is a wiring schematic of the electrical circuit used to create the magnetic field for the dispersing head.
Figure 6B:
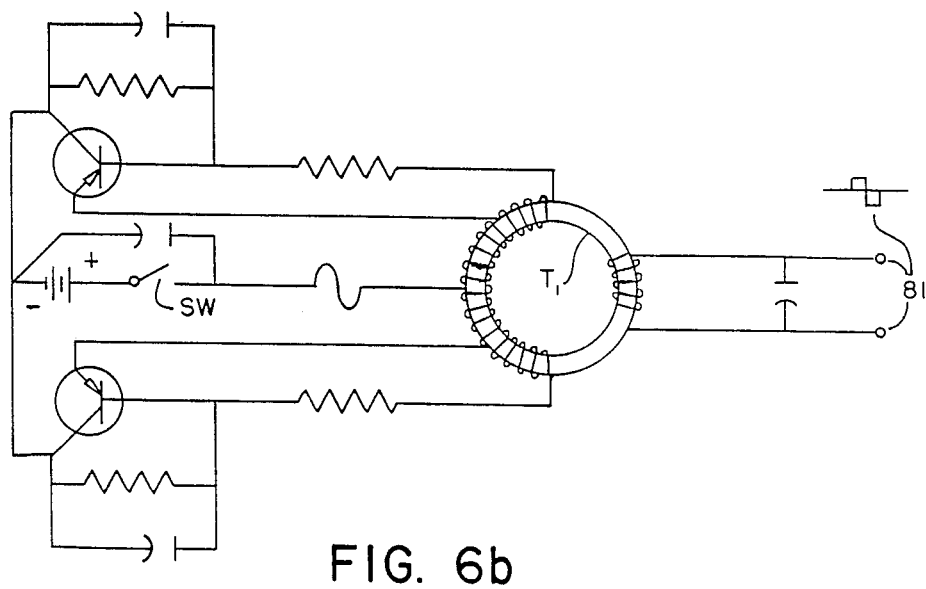

FIG. 6a is a schematic that will be recognized by those having skill in the field of automotive electronics. Essentially, a free-running, saturable core oscillator 80 is connected to an automotive power production and regulation system 90. When switch SW is engaged, oscillator 80 commences operation and the EMI field coils 42 are alternatingly energized at the frequency established by the basic oscillator 80. FIG. 6b is an electronic schematic of oscillator 80 taken at 6b —6b. This depiction, of a common oscillator of the saturable core type, yields an output 81 characterized as the alternating square wave. Again, those having skill in the field of electronics will recognize that the inventor has chosen the saturable core oscillator for powering the EMI field transformers for several reasons. It is known, for example, that the frequency of oscillation is determined by the battery voltage (here, standard 12 volt battery), the number of turns in the portion of the winding which feeds the emitters of the transistors, the flux density at which saturation occurs, and the cross-sectional area of the core. However, once the oscillator has been constructed, battery voltage is the only frequency governing parameter which requires consideration, the others being fixed by the number of turns placed on the core, and the nature and geometry of the core material. This type of oscillator is very efficient, with efficiencies often exceeding 90%. A further enhancement, low power drain, is acquired because an "off" transistor has high collector voltage but a current of practically zero and, when fully "on", (the other operating state of the transistor), collector current is high but collector voltage is extremely low. Thus, in either state, the product of collector voltage and current (power) yields low wattage dissipation in the collector-emitter diode.

From the foregoing, it will be apparent that the instant invention provides a unique protocol for the pretreatment of fuel to be used in an internal combustion engine because of the invention's unique embodiment of a heating-sonic cleaning device in conjunction with an EMI field-heated dispersing head. The use of an early stage manifold conduction heater is made in the interest of efficiency and expediency and is an adjunct to the aforementioned elements. Those of ordinary skill, particularly those skilled in this art, will recognize that such a preheating stage is not necessary and, indeed, in many instances contraindicated for safety reasons. Similarly, although various embodiments have been described and depicted herein, it will also be apparent to those skilled in this art that various modifications, additions, substitutions, etc. may be made without departing from the spirit of the invention, the scope of which is more clearly defined by the claims appended hereto.

What is claimed is:

1. A fuel expansion, pre-combustion treatment device for use with carbureted or fuel injected combustion engines comprising the combination of:
   sonic heating and fuel line cleansing means to heat said fuel while imparting high sonic vibrational characteristics to said fuel and therethrough to selected portions of the fuel pipeline in order to clean said portions and keep them free of depositional materials such as varnish;
   foraminous dispersing means comprised of magnetic material, physically coupled to said sonic heating and fuel line cleansing means so as to conduct fuel therefrom and obtain the benefit of said cleansing as well as to receive said fuel, said foraminous dispersing means having a plurality of foramens therein so that fuel conducted thereinto is expelled subsequently therefrom, while said dispersing means resides physically fixed proximate said engine and is subjected to a rapidly fluctuating EMI field; and
   EMI field generating means for essentially irradiating said dispersing means, whereby because of hysterisis losses caused by irradiation of said dispersing head in said field, said head will be caused to heat intensely, thereby imparting high energy to said fuel and causing its complete vaporization prior to its induction by said engine.

2. The invention of claim 1 further comprising means for preheating said fuel prior to its induction by said sonic heating and fuel line cleansing means, said preheating means comprising a heat conductive base with a first conduit therethrough and adapted for attachment to an exhaust manifold of said engine, conductive heat exchange means fixed within said first conduit, and second conduit means for affording fuel ingress to and egress from said first conduit.

3. The invention of claim 1 wherein said sonic heating and fuel line cleansing means comprises a tube made from heat conducting material and which contains internal oscillation generating means for imparting vibrational characteristics to fuel passing therethrough, said oscillating generation means responsive to pressure oscillations of a fluid passing through said tube and further, said tube adaptable for physical coupling to said dispersing head so that it may be receptive of heat energy conducted therefrom through said physical coupling to said tube.

4. The invention of claim 3 wherein oscillation generating means comprises at least one tuning fork.

5. The EMI field generating means of claim 1 further comprising a nonmagnetic case for effecting the physical coupling of said sonic heating and fuel line cleansing means and said dispersing means while confining at least said dispersing means therein, electromagnetic field generating means disposed adjacent said case, said field generating means physically disposed to radiate a magnetic field about said dispersing head, said field susceptible through use of suitable electronic circuitry and energization means of rapid changes in flux direction and intensity so that said rapid changes will cause said dispersing head to heat rapidly and intensely through hysterisis losses characteristic of its composition.

6. The invention of claim 5 wherein said circuitry comprises a free running, saturable core oscillator that is adapted to provide its output directly to said magnetic field generating means disposed adjacent said case.

7. A fuel expansion-vaporization device for use on a combustion engine comprising:
   fuel conduction means, said conduction means comprising a magnetic, foraminous conduit adapted for the conduct of fuel thereinto and for dispersing said fuel thereoutof, said conduction means disposed in and confined by nonmagnetic confinement means, said confinement means disposed for irradiation by a fluctuating magnetic field, and fluctuating magnetic field generating means disposed proximate said confinement means whereby subjection of said conduction means to a fluctuating magnetic field as herein defined causes heating of said conduction means and the consequent expansion-vaporization of fuel conducted therethrough.

8. The invention of claim 7 wherein said fuel conduction means comprises a tube made of magnetic material and having a foraminous end for expulsion of fuel vapor therefrom.

9. A method for heating fuel for a combustion engine while concurrently cleaning selective portions of the pipeline carrying said fuel and comprising the steps of heating said fuel as it passes through a conduit portion of said pipeline which has been configured therein with at least one vibratory device and, imparting high sonic vibratory characteristics to said fuel passing therethrough, the flow of said fuel contacting selected portions of the fuel line that will be freed of depositional materials such as varnish by said fuel vibratory action.

10. The method of claim 9 wherein heating said fuel comprises the additional steps of confining a foraminous, magnetic conduit in a nonmagnetic housing and subjecting said magnetic conduit to a rapidly fluctuating electromagnetic field generated outside said housing so that the fuel conducted therethrough will be heated to vaporization by the intensely heated magnetic conduit.

* * * * *